United States Patent
Porter

(10) Patent No.: US 9,841,047 B2
(45) Date of Patent: Dec. 12, 2017

(54) FASTENER ASSEMBLY ASSOCIATED WITH A MOUNTING SURFACE OF SUCH AS AN ELECTRONIC CONTROL MODULE OR BATTERY TRAY, THE MOUNTING SURFACE INCORPORATING A FLEXURAL AND THREE DIMENSIONAL CONFIGURED RECEIVING APERTURE PROFILE FOR RELIABLY SEATING AND RETAINING AN ASSOCIATED MOUNTING FASTENER WITH LOW INSERTION FORCE IN COMPARISON TO HIGHER EXTRACTION FORCE AND WITH MINIMAL LOSS OF MATERIAL

(71) Applicant: U.S. Farathane Corporation, Auburn Hills, MI (US)

(72) Inventor: Steve Porter, Romeo, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 204 days.

(21) Appl. No.: 14/711,656

(22) Filed: May 13, 2015

(65) Prior Publication Data
US 2015/0377276 A1    Dec. 31, 2015

Related U.S. Application Data

(60) Provisional application No. 62/017,985, filed on Jun. 27, 2014.

(51) Int. Cl.
F16B 41/00     (2006.01)
F16B 37/08     (2006.01)

(52) U.S. Cl.
CPC ........ *F16B 41/002* (2013.01); *F16B 37/0842* (2013.01)

(58) Field of Classification Search
CPC .... F16B 41/002; F16B 37/0842; F16B 21/00; F16B 21/06
USPC ......................................... 411/999, 525, 526
See application file for complete search history.

(56) References Cited

U.S. PATENT DOCUMENTS

| | | | |
|---|---|---|---|
| 4,179,791 A | 12/1979 | Speraw | |
| 4,908,245 A * | 3/1990 | Shah | E06B 1/6069 180/253 |
| 5,024,488 A * | 6/1991 | Lindhuber | B60B 7/0013 301/108.2 |
| 5,290,132 A * | 3/1994 | Gnage | F16B 41/002 411/107 |
| 5,707,192 A * | 1/1998 | Vortriede | F16B 37/041 411/175 |
| 5,871,188 A | 2/1999 | Lyle | |

(Continued)

*Primary Examiner* — Flemming Saether
(74) *Attorney, Agent, or Firm* — Dinsmore & Shohl LLP

(57) ABSTRACT

A retaining feature incorporated into a mounting surface of a plasticized article which is adapted to receive and retain a fastener prior to final assembly. The retaining feature exhibits an irregular and three dimensional shaped closed profile defined along an interior perimeter configured within the mounting surface and which establishes a degree of flex or bend upon insertion of the fastener with minimal loss of material. The insertion force can be any of lesser, equal to or greater than the extraction force, in combination with providing a rated side load breaking/shearing strength of the bolt from the material defined retaining feature.

7 Claims, 12 Drawing Sheets

(56) References Cited

U.S. PATENT DOCUMENTS

| | | | |
|---|---|---|---|
| 5,890,861 A * | 4/1999 | Kaiser | F16B 41/002 |
| | | | 411/353 |
| 6,742,756 B1 | 6/2004 | Fimeri et al. | |
| 6,986,494 B2 | 1/2006 | Strasser | |
| 6,997,662 B2 * | 2/2006 | Nishikawa | B62D 25/2072 |
| | | | 411/433 |
| 7,114,901 B2 * | 10/2006 | Maruyama | F16B 5/0208 |
| | | | 24/293 |
| 7,543,788 B2 | 6/2009 | Herb | |
| 7,921,536 B2 * | 4/2011 | Dole | F16L 17/04 |
| | | | 29/463 |
| 8,430,372 B2 | 4/2013 | Haddock | |
| 8,602,445 B2 | 12/2013 | Williams et al. | |
| 8,616,516 B2 | 12/2013 | Rittner et al. | |
| 9,243,657 B2 * | 1/2016 | McCorkell | B60J 5/0468 |
| 2004/0217236 A1 | 11/2004 | Shibuya | |
| 2006/0056936 A1 * | 3/2006 | Ishimaru | F16B 41/002 |
| | | | 411/81 |
| 2007/0210234 A1 | 9/2007 | Lin | |
| 2011/0031364 A1 | 2/2011 | Kneshtel, Jr. et al. | |
| 2013/0037667 A1 | 2/2013 | Goldin et al. | |
| 2013/0200245 A1 | 8/2013 | Markiewicz et al. | |
| 2016/0069364 A1 * | 3/2016 | Montague | F16B 41/002 |
| | | | 411/511 |

* cited by examiner

| Sample # | Insertion Temp | Peak Insertion Force | Side Load | Side Load Direction | Peak Extraction Force |
|---|---|---|---|---|---|
| 1 | 23 Deg C | 243 N | - | - | 528 N** |
| 2 | 23 Deg C | 265 N | - | - | 514 N** |
| 3 | 23 Deg C | 244 N | - | - | 517 N** |
| 4 | 23 Deg C | 249 N | 90 N | 12:00 | 482 N** |
| 5 | 23 Deg C | 244 N | 90 N | 3:00 | 489 N** |
| 6 | 23 Deg C | 253 N | 90 N | 6:00 | 516 N** |
| 7 | 23 Deg C | 251 N | 90 N | 9:00 | 521 N** |
| 8 | 90 Deg C | 172 N | - | - | 541 N** |
| 9 | 90 Deg C | 136 N | - | - | 422 N*** |
| 10 | 90 Deg C | 165 N | - | - | 480 N** |
| 11 | 23 Deg C | - | 120 N* | 6:00 | |

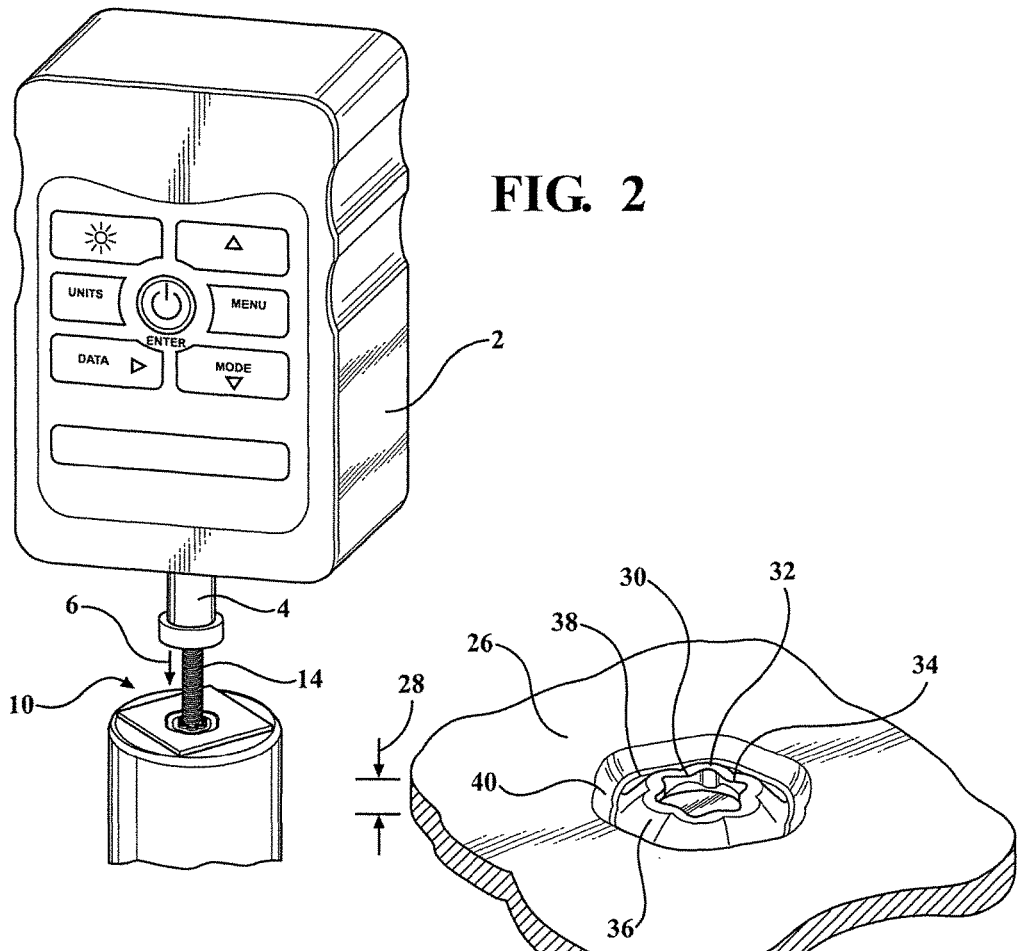
FIG. 2
FIG. 3A
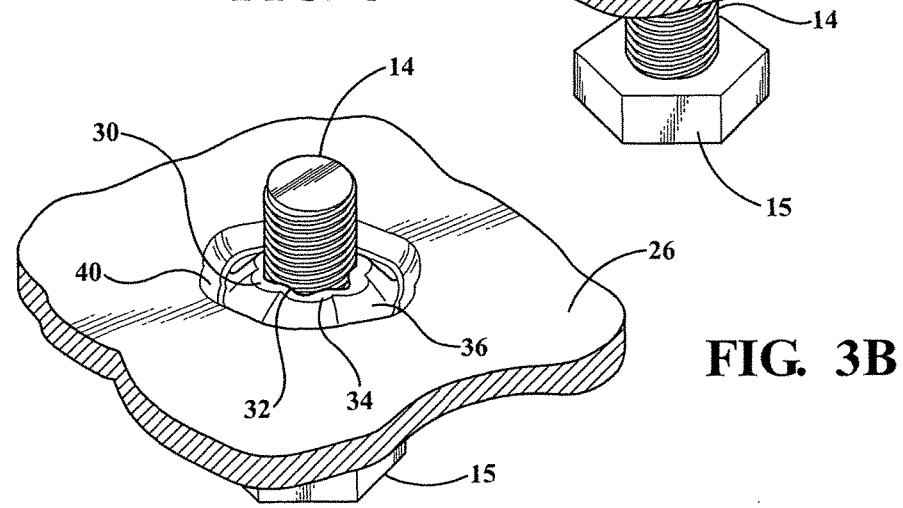
FIG. 3B

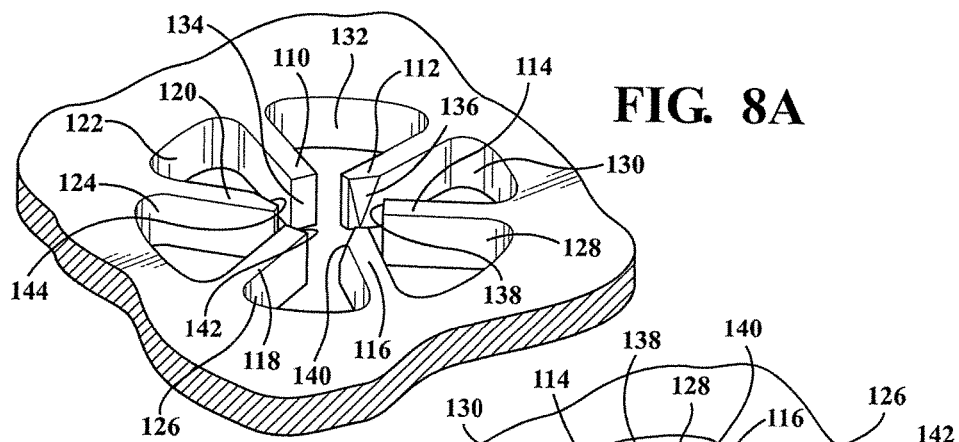
FIG. 8A
FIG. 8B
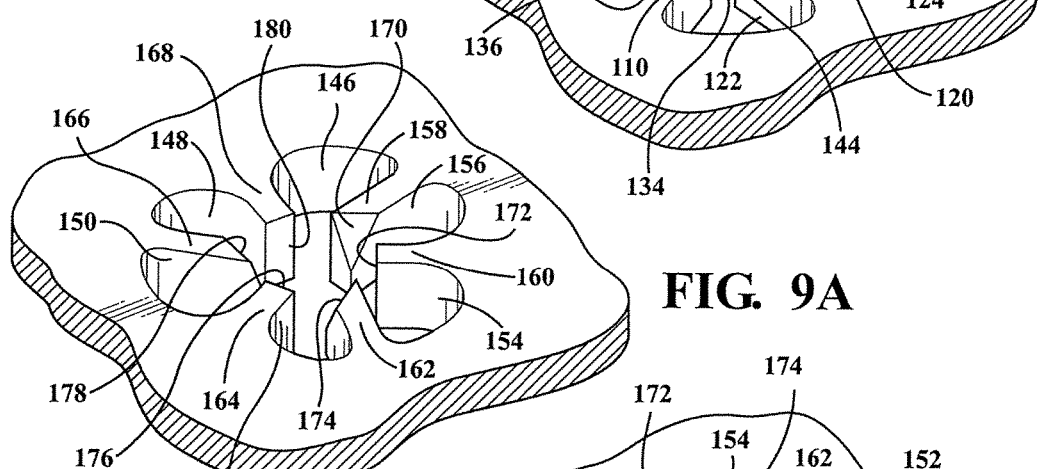
FIG. 9A
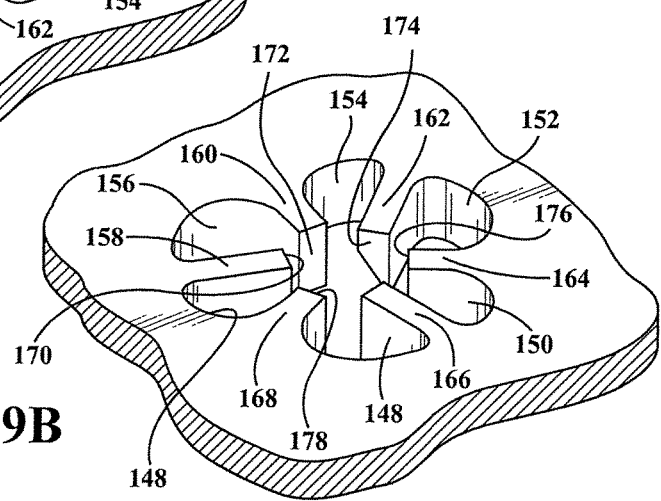
FIG. 9B

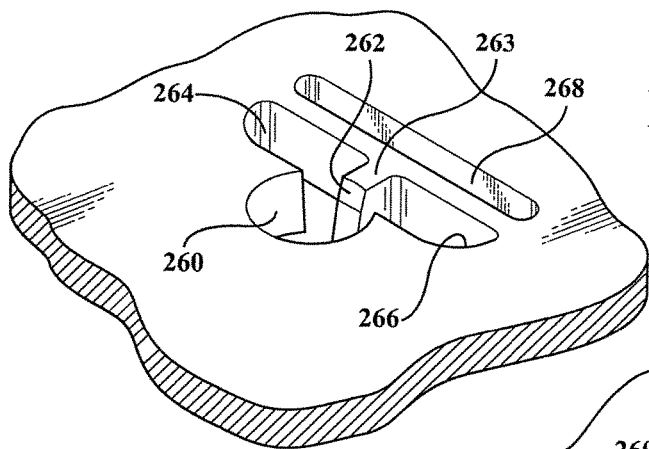
FIG. 14A
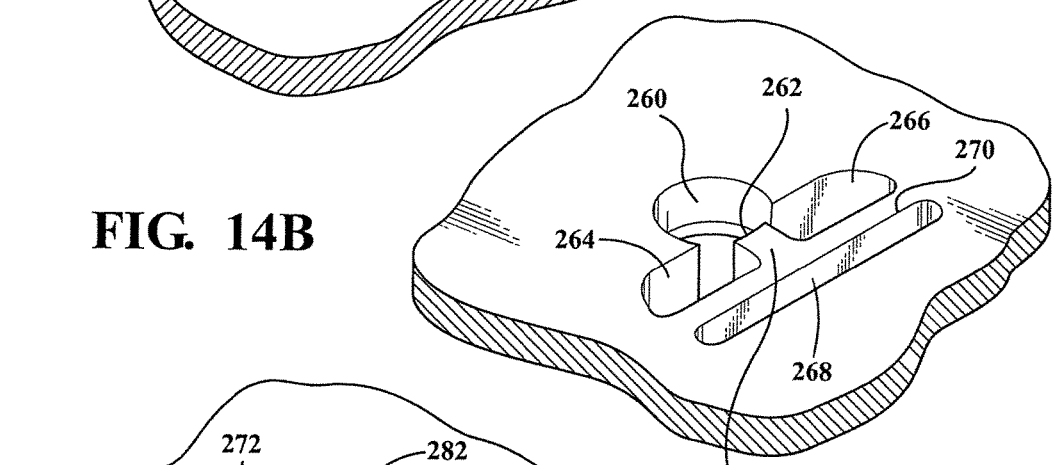
FIG. 14B
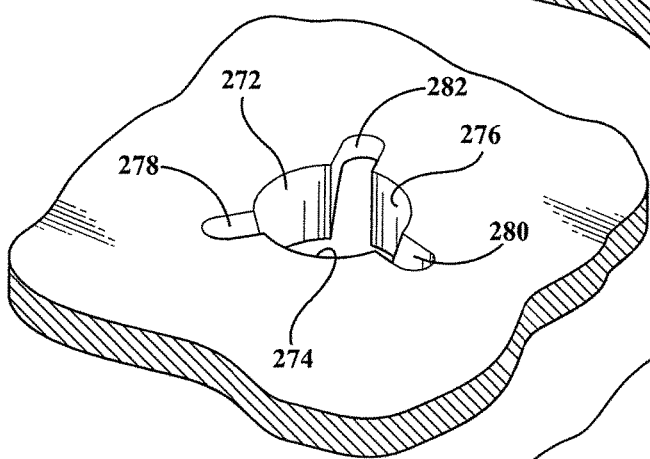
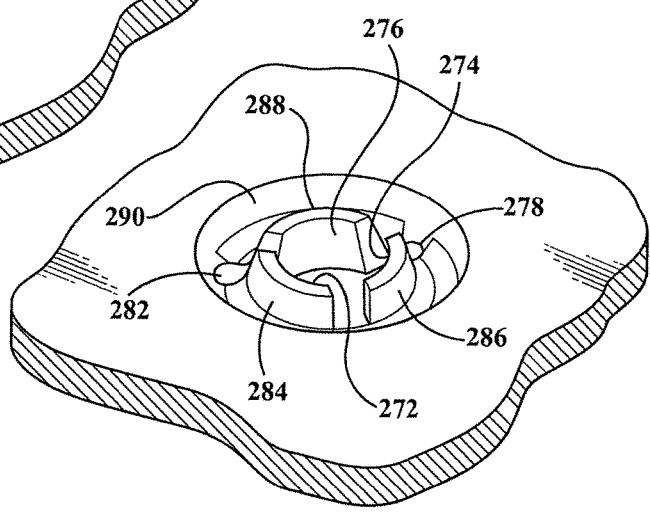
FIG. 15A
FIG. 15B

| Hole # | Average Insertion (N) | Average Extraction (N) | Side Load (N) | Average Extraction After Side Load (N) | Side Load Breaking Point (N) |
|---|---|---|---|---|---|
| FIG. 12B | 97.3 | 90.9 | 12 | 93.1 | 25 |
| FIG. 13 | 173.43 | 222.3 | 25 | 220.1 | 37.5 |
| FIG. 14 | 205.5 | 199.8 | 25 | 202.2 | 45 |
| FIG. 15 | 102.7 | 251.2 | 50 | 276.9 (A) | 87 |
| | | | 50 | 224.1 (B) | 87 |
| FIG. 17 | 133.6 | N/A | 100 | 349.1 | 93 |
| FIG. 19 | 179 | 386 | 90 | 425.5 (P) | 101 (P) |
| | | | 90 | 453.9 (V) | 110 (V) |

FIG. 20

FASTENER ASSEMBLY ASSOCIATED WITH A MOUNTING SURFACE OF SUCH AS AN ELECTRONIC CONTROL MODULE OR BATTERY TRAY, THE MOUNTING SURFACE INCORPORATING A FLEXURAL AND THREE DIMENSIONAL CONFIGURED RECEIVING APERTURE PROFILE FOR RELIABLY SEATING AND RETAINING AN ASSOCIATED MOUNTING FASTENER WITH LOW INSERTION FORCE IN COMPARISON TO HIGHER EXTRACTION FORCE AND WITH MINIMAL LOSS OF MATERIAL

CROSS-REFERENCE TO RELATED APPLICATIONS

This Application claims the benefit of U.S. Provisional Application 62/017,985 filed on Jun. 27, 2014, the contents of which is incorporated herein in its entirety.

FIELD OF THE INVENTION

The present invention is directed to an article, assembly and method for configuring a variety of irregular and three dimensional shaped aperture defining profiles, such as within a mounting surface of a plasticized article not limited to any of a battery tray or ECM (electronic control module). The advantage of such an aperture defining reconfiguration is that in enables the pre-insertion and retention of bolt fasteners during shipping of the tray or module prior to end user installation using nuts, compression washers and the like, and such further occurring with minimal loss of material (such as resulting from shearing of the plastic surrounding the retention feature defining aperture during insertion of the bolt). The variations of the irregular configured and three dimensional aperture defining retention profiles are each further such that they provide varying degrees of flexibility during (low) force fastener insertion, combined with any desired force retaining profile, such as including in one instance high force resistance to (reverse direction) extraction, in combination with respectable side load breaking/shearing strength. Additional retaining feature and inserting bolt fastener combinations are also envisioned, such as in which an insertion force can be designed to be equal to or higher than the (reverse) extraction force, such extraction force typically being set at a certain minimum or threshold.

BACKGROUND OF THE INVENTION

The prior art is well documented with fastener constructions. Most typically, this includes a threaded bolt, fastener nut and, typically a washer or spring washer. Shipping of large volume components, such as including plasticized materials not limited to battery trays, control modules and the like associated with vehicular installation applications, often include pre-installing (prior to shipping to the final install location) the bolt fasteners through typically oversized apertures in the plastic tray or other support surface (this in order to prevent excess shearing of material during the installation of the bolt), the aggregated cost of the fastener and associated nuts and washers further adding to the overall expense.

Other examples of fastener assemblies include a variable fit fastener depicted in Speraw, U.S. Pat. No. 4,179,791, and which teaches a two piece hand-manipulated variable fit fastener is disclosed with an elongated fastener member having a reduced axially extending portion permitting the fastener member to be folded on itself prior to being inserted through aligned apertures located in a pair of mating surfaces and a retainer element having a plurality of locking surfaces, the retainer element being slidably mounted on the fastener member. After insertion through the aligned apertures in the mating surfaces, the fastener element is unfolded to a position engaging one of the locking surfaces in the retainer element to lock the fastener member in the unfolded position. The positioning of the fastener member in the unfolded position also allows a pair of end shoulder portions to engage one of the mating surfaces and the retainer element to fasten the mating surfaces together.

US 2004/0217236, to Shibuya, teaches a vibration-proof clamp capable of achieving high vibration-proof performance with high reliability. A housing member exhibits a rectangular housing space. An elastic tubing-retaining member is housed in the space of the housing member and is adapted to hold a tube body. The tubing-retaining member includes a plurality of inner tubing-retaining surfaces, with channels provided between the respective adjacent tubing-retaining surfaces, a plurality of cavities being formed within the tubing-retaining member. When the tube body is vibrated and displaced, the cavity and the channel are operable to absorb the displacement of the tube body so as to provide vibration-proof performance.

Finally U.S. Pat. No. 6,986,494, to Strasser, teaches a self-aligning bracket for use in mounting a planar surface such as a roof to a fixed structure such as a bank of fuel cylinders mounted to the roof of a vehicle frame. The bracket provides a locating block on a saddle mount which co-operates with a depression formed on the inner surface of the roof to align fasteners depending from the roof with a coupling fastener on the bracket. The coupling fastener is laterally moveable within an oversized hole in the bracket and engages the locating block to permit co-rotation. An anchor is attached to an end of the coupling fastener so that when the roof fastener is actuated in the coupling fastener, the anchor is drawn towards the coupling fastener, tightening the locating block, coupling fastener and anchor to the saddle mount, preventing further lateral movement.

SUMMARY OF THE INVENTION

The present invention discloses a retaining feature incorporated into a mounting surface of a plasticized article which is adapted to securely receive and retain a bolt fastener prior to final assembly with a nut. The retaining feature exhibits an irregular and three dimensional shaped closed profile defined along an interior perimeter configured within the mounting surface and which establishes a degree of flex or bend upon insertion of the fastener and with minimal loss (shearing) of material.

The profile, in combination with the bolt, establishes a first bolt insertion force and a second resistance to extraction force. While typically being significantly less than the extraction forced, the insertion force may also be equal to or greater than the extraction force, in combination with establishing respectable side load breaking/shearing strength of the bolt from the material defined retaining feature. To this end, the extraction force may be set at a threshold minimum. Other features include the plasticized article having a specified shape and size not limited to a battery tray or ECM (electronic control module).

An underside configuration associated with the three dimensional shaped closed profile may also include a plurality of interconnecting inner surfaces defining a flexural engaging lip or ledge. A concave shaped channel or cavity extends about a perimeter of the inner lip, defining a reduced thickness of the material mounting surface, and terminates at an outer annular spaced and inwardly facing perimeter end wall. A corresponding underside configuration associated with the three dimensional shaped and fastener stem engaging profile further includes any arrangement of arcuate inner support ledges defining fastener contact locations and, in combination with any alternating or overlapping combination of radial or otherwise projecting slots or profiles, for providing desired properties of non-shearing flex or bend of the material.

BRIEF DESCRIPTION OF THE DRAWINGS

Reference will now be made to the attached drawings, when read in combination with the following detailed descriptions, wherein like reference numerals refer to like parts throughout the several views, and in which:

FIG. 2 depicts a strength test experiment associated with the retention feature and insertion bolt of FIG. 1;

FIGS. 3A-3B illustrate pre and post installation of a bolt fastener through an irregular configured and three dimensional aperture defining profile associated with the retention feature of the present inventions;

FIGS. 8A-8B are upper and lower perspectives of a mounting surface with multi-dimensional retaining feature according to another variant of the present invention and including a plurality of radial extending beams defining peripherally arrayed and petal-shaped profiles in combination with an open central and bolt receiving location;

FIGS. 9A-9B depict a modification of FIGS. 8A-8B in which the shape and dimension of the petal shaped profiles is modified;

FIGS. 14A-14B illustrate upper and lower perspectives of a mounting surface with multi-dimensional retaining feature according to a modification of FIGS. 13A-13B and including a central chamfered circular aperture in combination with a reduced portion of an inner communicating profile in combination with a single outer parallel extending slot which functions to provide material deforming and non-shearing retention of pre-inserted bolt fasteners;

FIGS. 15A-15B illustrate upper and lower perspectives of a mounting surface with multi-dimensional retaining feature, the upper perspective being an intermediate variant of FIGS. 4A and 5A, with the lower perspective further showing an inner perimeter defined by arcuate tapered and segmented underside surfaces associated with the central retaining aperture, in combination with an outwardly concentric located and inwardly facing circumferential end wall for providing material deformation during bolt installation with minimal loss of material resulting from shearing forces attendant with bolt insertion, while maximizing bolt holding/retention properties;

FIG. 20 is a further tabular representation of the material profiles depicted in selected variants FIGS. 12B, 13, 14, 15, 17 and 19.

DETAILED DESCRIPTION OF THE PREFERRED EMBODIMENTS

As previously described, the present invention is directed to an article, assembly and method for configuring a variety of irregular and three dimensional shaped closed profiles, such being configured within underside surfaces surrounding the mounting apertures of a plasticized article not limited to a battery tray or ECM (electronic control module), and which define any configuration of retaining feature for gripping the threaded shaft of a mounting bolt upon pre-insertion of the same. As also previously recited, the advantage provided by the various three dimensionally configured material profiles is that they enables the pre-insertion and retention of bolt fasteners during shipping of the tray or module prior to end user installation using nuts, compression washers and the like, and such further occurring with minimal attendant degree of deformation or non-fracturing bending of the perimeter engaging walls associated with the retaining profile, and with minimal loss or stripping (i.e. shearing) of the plastic surrounding the retention feature defining aperture.

The variations of the irregular configured and three dimensional aperture defining retention profiles are each further such that they provide varying degrees of flexibility during (low) force fastener insertion, combined (in one non-limiting variant) with high force resistance to (reverse direction) extraction, in combination with respectable side load breaking/shearing strength. As will be described in additional detail with reference to the following depicted variants, it is also envisioned that material and fastener configurations can be varied (such as by changing the material composition of the plastic and/or retaining feature profiles) in order to modify the insertion/extraction forces. This can include redesigning to increase the insertion force to a value equal to or greater than the (opposing) extraction force, such as which can further be established at a specified minimum.

Figure 1A:
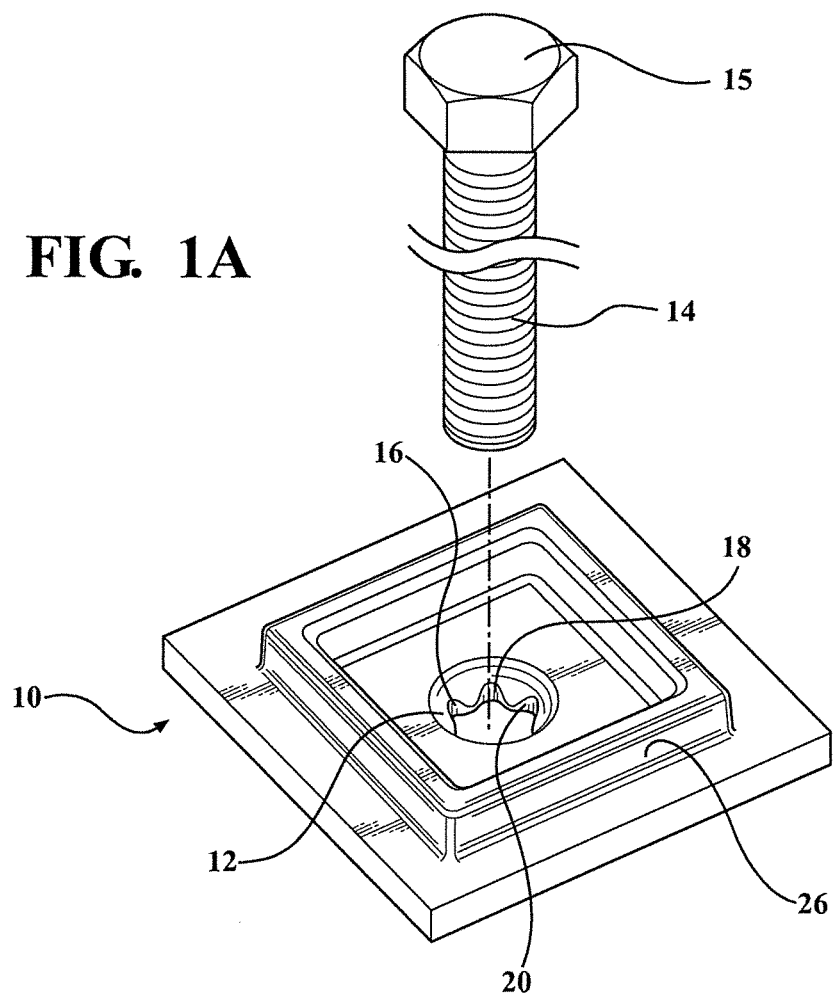
FIGS. 1A-1B are respective top and bottom rotated illustrations of one variant of a tray or module mounting surface with three dimensional retention feature for receiving such as an engaging bolt fastener.
Figures 1B, 1C:
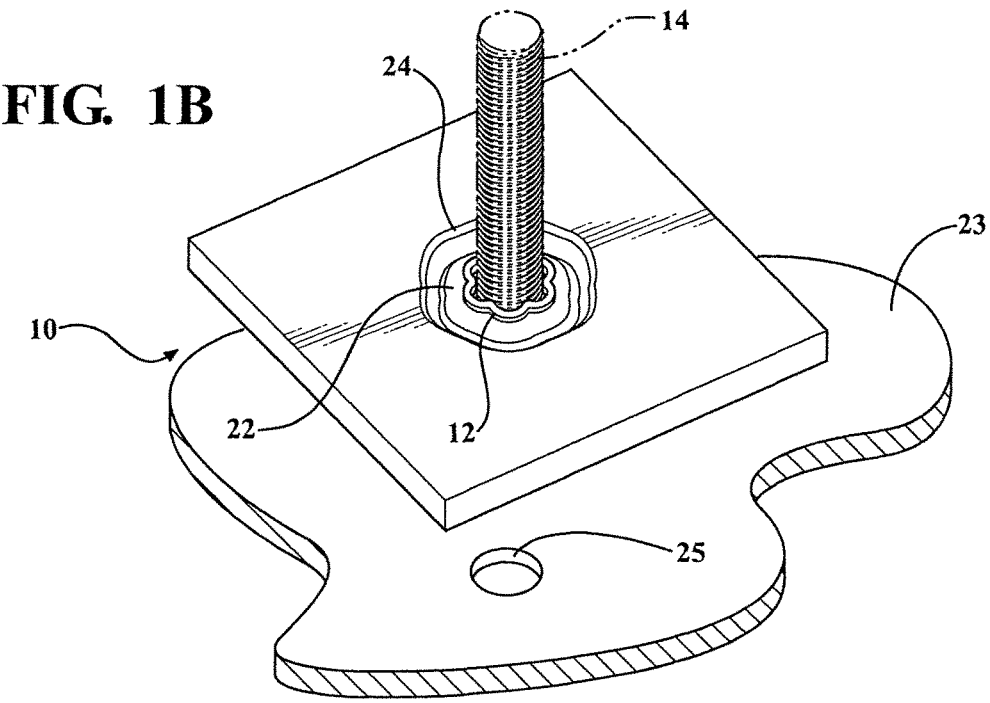
FIG. 1C provides tabular results for such as insertion force, extraction force, and side load forces and directions of application of the retention feature of FIGS. 1A-1B.

The above stated, FIGS. 1A-1B are first and second rotated perspective illustrations, at 10, of one variant of a tray or module mounting surface with three dimensional retention feature (defined as perimeter extending interior and three dimensional profile 12 as best depicted in FIG. 1A) and engaging bolt fastener 14. As will be described with further reference to the succeeding illustrations, the bolt retention features of the present invention can exhibit any variety of three dimensionally configured profiles incorporating an aperture insertion location for receiving the threaded edges of the bolt stem (see as best shown in phantom in FIG. 1B).

The ability to in-mold into the plastic material mounting surface (e.g. battery tray or ECM control module) an aperture profile having a reduced material thickness, and which can flexurally deflect to a given degree in order to grip the threaded edge of the bolt stem (such as following initial or pre-installation and prior to shipping and final installation at a remote location) without incurring any significant degree of material fracture or shear. In this fashion, secure and reliable pre-insertion of the bolts is enabled prior to shipping and results in significant reductions to each of material, manufacture and assembly of the desired component exhibiting a plasticized mounting surface.

For purposes of ease of illustration, the material structure, typically a plastic mounting layer associated with each of the three dimensional retention features described herein, is depicted in FIGS. 1A and 1B as a square shaped piece, it being further understood that the various retention profiles are usually configured in plural fashion, such as being in-molded, within the mounting layer of the article (e.g. plastic battery tray, electronic control module, etc.). With further reference to the succeeding illustrations, the present invention teaches a variety of three dimensional retaining profiles, such as in each instance including a reduced material thickness terminating in an inner perimeter lip edge which is configured for engaging the bolt fastener threaded stem in any biasing/deforming and non-material shearing fashion.

Without limitation, any of the material retaining profiles (not limited to those depicted herein) can additionally or alternatively be integrated into separate components, such as configured within an additional attachable layer (as can be established by piece 10) and having a length, width and thickness. As shown, such can include any of a square/rectangular, disk or washer shape, such as which can be aligned with a reverse face of a primary plasticized or material mounting layer (see as represented in partially exploded fashion by layer 23 in FIG. 1B and which can include a standard aperture 25 over which is aligned a smaller square shaped attachment constituted by the piece 10 of FIGS. 1A and 1B with profile feature defined there through).

For purposes of such an alternate variant, the material layer may further include additionally formed/configured apertures, or which may possess standard sized and shaped apertures such as shown at 25 and which are arranged in alignment with the retaining profile configured upon the square shaped or other attachable component applied to a face of the primary material layer in alignment with its standard or otherwise configured aperture, and through which the bolt 4 or other suitable fastener (standard screw, self-tapping screw, etc.) can be inserted in a likewise minimal material shearing and material deforming/fastener restraining fashion prior to end user installation.

The first and second rotated views of the retention feature depicted in the initial example of FIGS. 1A-1B exhibit a first selected of a number of different three dimensional configurations and which includes a combination arcuate and irregular profile defined by contiguous undulating locations 16, 18, 20, et. seq., which define an interior extending ledge (fastener contacting portion) of the profile 12. Also best depicted in FIG. 1B is the concave trench or depression 22 which defines a moat or encircling profile around the interior irregular edge profile 12, an outer wall 24 further being shown and, in combination with the inner most perimeter edge associated with the undulating locations 16, 18, 20, et seq., defining the inner and outer annular boundaries of the flexural retention feature.

The aperture exhibits a unique profile for receiving the threaded bolt stem, such as again can be accomplished in one non-limiting application by injection molding of the base plastic layer and which can further exhibit an overall configured material thickness the same or even less than the surrounding uniform base layer. Without limitation, the upper facing side of the material layer (see again FIG. 1A) can include a flattened profile or, as shown, can also exhibit and raised surface 26 such as defining a square shaped receiving area for seating an enlarged head 15 of the screw bolt 14 (FIG. 1A).

FIG. 1C provides both tabular results and summary of insertion force, extraction force, and side load forces and directions of application of the retention feature of FIGS. 1A-1B. For purposes of the present description, force measurements are presented in Newtons (N), which are defined as the force needed to accelerate one kilogram of mass at one meter per second squared (N=1 kg. ° m/sec$^2$). As indicated, the material retaining profiles provide (in one non-limiting variant) a combination of low insertion force, high (reverse) extraction force, and respectable side load resistance force to breakage corresponding to different forces and directions of application (measured in twelve, three, six and nine o'clock respectively). As also indicated, slight variations in insertion (136 N-265 N) and extraction (422 N-541 N) forces can vary sample from sample, further given variations in insertion temperature (specimens being provided at temperatures of both 23° C. and 90° C.).

FIG. 2 is an environmental illustration of a force gauge tool, see at 2, conducting a controlled experimentation of a force applied to the retention feature and insertion bolt of FIG. 1A, this further effectuated by an end displaceable and gripping location 4 of the gauge tool engaging the projecting threaded shaft of the bolt fastener 14 and forcibly pushing (see arrow 6) the fastener until the stem forcibly disengages from the configured perimeter defining profile, such as by fracturing or inverting the flexural profile defined in the mounting material. This in particular includes exerting a controlled insertion force on a selected retaining feature, such as in one non-limited controlled application at a feed rate of 330 mm/min, with a counter extraction force measured at a given extraction rate (for example 50 mm/min).

A typical failure condition is characterized by inversion of the material surrounding the aperture retaining feature (e.g. the profile defined edge collapses in a reverse/outwardly facing direction to the concave defined underside beyond which the bolt shaft is press fit), and which is typified by the high force resistance of the feature profile edge to extraction of the bolt stem. Additional testing protocols further contemplate application of a 90 N side load (i.e. a force applied at either of the 3 o'clock or 9 o'clock positions as opposed to a straight down pushing force (at 6 o'clock or 12 o'clock directions as in FIG. 2) to a projecting tip of the bolt stem 14 by the engaging bit end 4 of the force gauge.

FIGS. 3A-3B illustrate each of pre and post installation illustrations of a bolt fastener (a representative portion of which is again depicted at 14) mounting through an irregular configured and three dimensional aperture defining profile, similar in respects to that shown in FIGS. 1A-B, and associated with the retention feature of the present inventions. A material layer 26 depicted in partial cutaway in each of FIGS. 3A-3B has a given overall edge thickness 28.

The inverted (underside facing) perspective of FIGS. 3A-3B illustrates the pre-inserted configuration of a mounting profile having an inner perimeter defining edge with irregular or undulating portions 30, 32, 34, et. seq. A concave or valley depression surrounds the inner most and aperture defining mounting profile and includes an outwardly and downwardly sloping wall 36 terminating at an outer most recessed edge 38 (this corresponding to a thinnest location of the mounting profile), an upwardly sloping and outermost end wall 40 communicating the outer most recessed edge 38 with the underside surface of the material layer 26. In this fashion, the material mounting layer can be engineered with any shape, pattern, thickness or concavity in order to provide the aperture defining profile with the desired flexural properties for gripping the inserted bolt stem.

Upon inserting the fastener 14 in the manner shown in FIG. 3B, the flexural aspects associated with the inner configured profile (owing to the reduced material thickness associated with the concave encircling moat or pattern) provides the innermost perimeter edge defining profile with the ability to flex and expand during passage therebetween of the bolt stem, and as opposed to a situation in which a more rigid edge profile resists bolt insertion with excessive shearing the material associated with the inner profile edge. In this fashion, the threaded bolt stem 14 is secured in its pre-inserted and non-fastened condition with respect to each of the profile retaining features, again prior to application of the fastening nut or the like during end stage assembly.

Figure 4A:
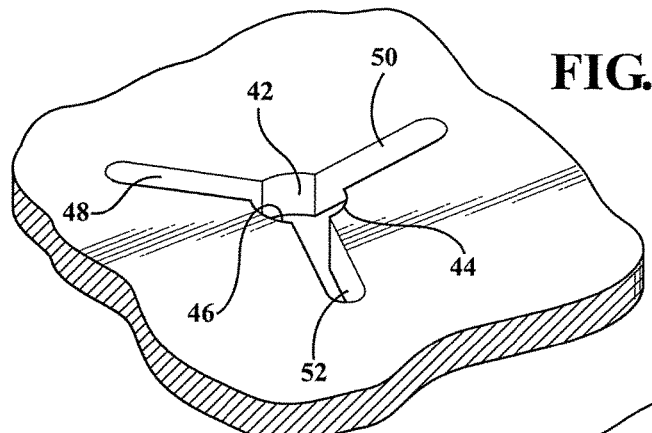
FIGS. 4A-4B are upper and lower perspectives of a mounting surface with multi-dimensional retaining feature according to another variant of the present inventions and including a central circular aperture communicating with three radially projecting slot apertures.
Figure 4B:
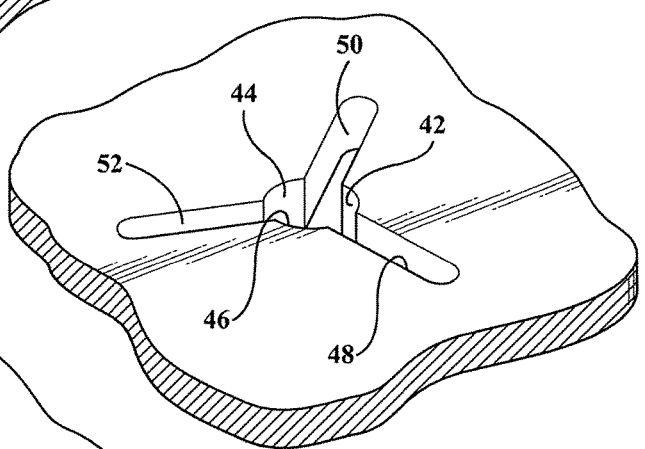

FIGS. 4A-4B are upper and lower perspectives of another mounting surface with multi-dimensional retaining feature according to another variant of the present inventions. The retaining feature is exhibited by a central arcuate (also circular extending) inner perimeter defining surface portions 42, 44 and 46 these inter-communicating with three perimeter spaced and radially projecting slot apertures 48, 50 and 52. Although not shown, the threaded stem 14 of the bolt fastener is pre-inserted through the central aperture defined by the spaced apart and innermost surfaces 42, 44 and 46, the relative dimensioning of which permits the incremental deflection of the peripheral wall surfaces of the circular/arcuate defining aperture and in order to achieve a desired range of flexural motion to resistively retain the bolt in place prior to final assembly (again with minimal shearing of material).

Figure 5A:
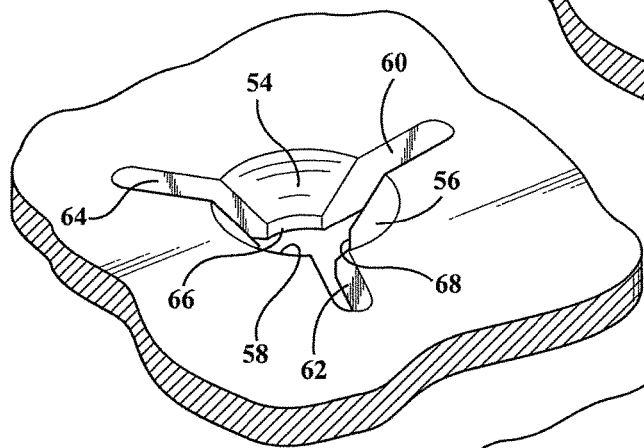
FIGS. 5A-5B are upper and lower perspectives of a further mounting surface with multi-dimensional retaining features similar to FIGS. 4A-4B and illustrating an enlarged central aperture with inwardly tapered or dovetail perimeter surfaces.
Figure 5B:
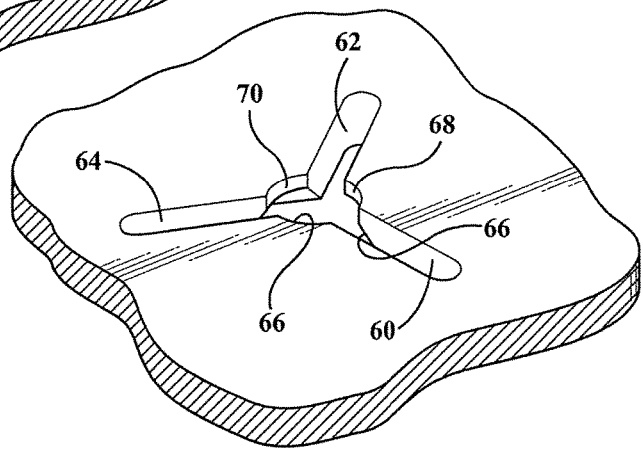

FIGS. 5A-5B are upper and lower perspectives of a further mounting surface with multi-dimensional retaining features similar to FIGS. 4A-4B and illustrating an enlarged central aperture with inwardly tapered or dovetail arcuate perimeter surfaces 54, 56 and 58 (FIG. 5A), these interspersed with outer radial slot shaped apertures 60, 62 and 64. The dovetail surfaces further define bottom/innermost ledges 66, 68 and 70 which establish flexural contact locations with the outer annular surface locations of the threaded bolt stem.

Figures 6A, 6B, 7A, 7B:
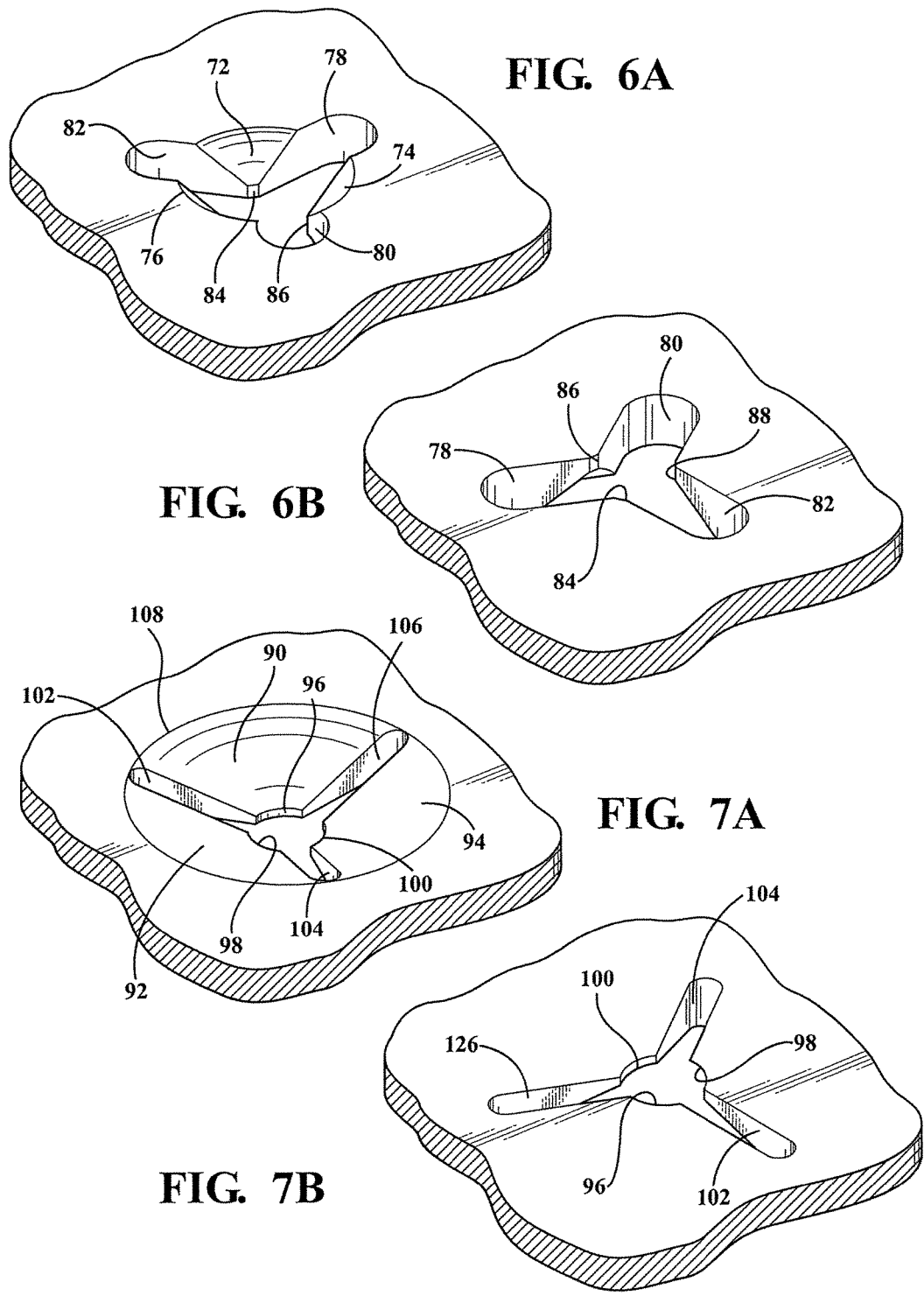
FIGS. 6A-6B are upper and lower perspectives of a mounting surface with multi-dimensional retaining feature according to another variant related to FIGS. 5A-5B and exhibiting an enlarged central tapered aperture which substantially merges with both shortened and widened radially projecting slot apertures.
FIGS. 7A-7B are upper and lower perspectives of a mounting surface with multi-dimensional retaining feature according to a further related sub-variant of FIGS. 4A-4B and depicting a similar central circular aperture communicating with three radially projecting slot apertures, combined with a further enlarged circular tapered depression which extends to an outer periphery of the slots.

FIGS. 6A-6B are upper and lower perspectives of a mounting surface with multi-dimensional retaining feature according to another variant related to FIGS. 5A-5B and exhibiting an enlarged central tapered aperture (established by a plurality of interconnecting and depth/thickness angled and tapered circumferential surfaces 72, 74 and 76) which substantially merges with both shortened and widened radially projecting slot apertures 78, 80 and 82. Bottom/innermost ledges 84, 86 and 88 are further again defined, these smaller in scale to those depicted at 66-70 in FIGS. 5A-5B and for providing flexural support locations in contact with the inserting fastener.

FIGS. 7A-7B are upper and lower perspectives of a mounting surface with multi-dimensional retaining feature according to a further related sub-variant of FIGS. 5A-5B. As shown, tapered concave surfaces 90, 92 and 94 include inner most perimeter contact edges 96, 98 and 100, which are separated by three radially projecting slot apertures 102, 104 and 106, these being combined with the further enlarged circular tapered depression (90, 92 and 94) which extends to an outer surface periphery of each of the slots (see also outer annular perimeter 108). In this fashion, the three peripherally arranged and sloping surfaces 90, 92 and 94 define plastic flexural portions which respond to inserting contact of the threaded edges of the bolt stem against the inner most perimeter edges 96, 98 and 100 by deflecting a necessary degree to facilitate engaging contact, again with minimal shearing or loss of material resulting from fastener insertion.

FIGS. 8A-8B are upper and lower perspectives of a mounting surface with multi-dimensional retaining feature according to another variant of the present invention and including a plurality of radial extending beams, at 110-120, these defining in alternating and peripherally arrayed fashion a plurality of petal-shaped profiles, the inner arcuate extending and interconnecting surfaces for which are further depicted at 122-132. An open central and bolt receiving location is defined by inwardly extending end faces of the beams 110-120, respectively further referenced at 134, 136, 138, 140, 142 and 144. Of these, end faces 136, 140 and 144 are chamfered or angled in order to assist in providing enhanced gripping of the inserted bolt stem (not shown).

Without limitation, any or all of the inwardly facing beam end faces can exhibit an angled or tapered edge profile (as opposed to linear or flat inner ends associated with the other beams) and in order to enhance the desired features of deflection/expansion of the material edge locations of the retaining feature in response to bolt insertion, again without incurring excessive material shear/loss resulting from the pre-insertion of the fastener, such again occurring prior to end-stage installation.

FIGS. 9A-9B depict a modification of FIGS. 8A-8B in which the shape and dimension of the petal shaped and interconnected arcuate profiles 146, 148, 150, 152, 154 and 156 is modified in both size and configuration relative to shortened intersecting and radially projecting beams 158, 160, 162, 164, 166 and 168. As in the variant of FIGS. 8A-8B, each of the beams include an inner most defined and flexural end face or contact surface 170, 172, 174, 176, 178 and 180, with selected beam end faces 170, 174 and 178 again exhibiting tapered inner radial extending edges facilitating in deflecting and non-shearing engagement of an appropriately dimensioned threaded fastener stem.

Figure 10A:
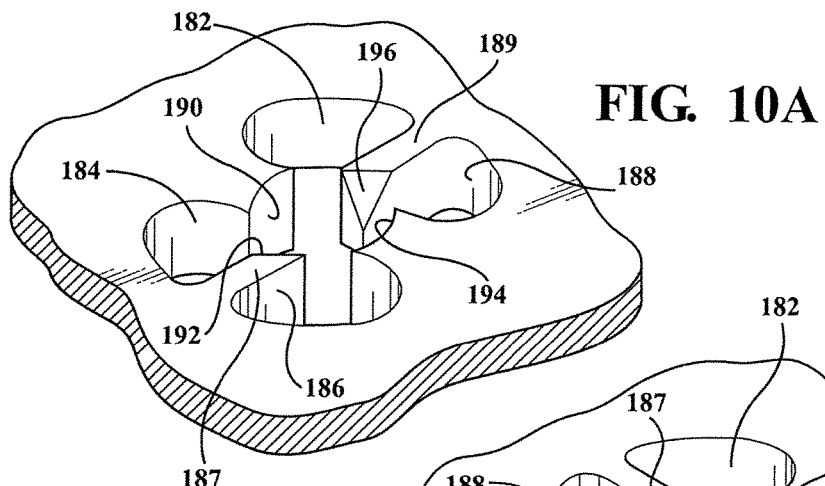
FIGS. 10A-10B depict a further modification of the variant of FIGS. 9A-9B in which a reduced number of peripherally arrayed petal shaped profiles are configured into the multi-dimensional retaining feature.
Figure 10B:
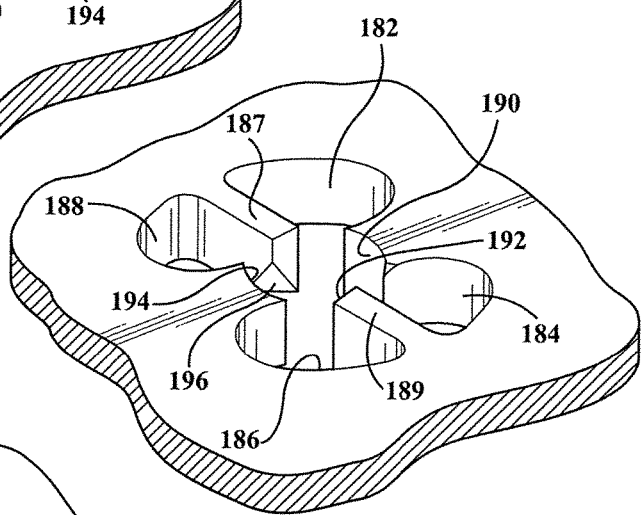

FIGS. 10A-10B depict a further modification of the variant of FIGS. 9A-9B in which a reduced number of peripherally arrayed petal shaped and inner aperture defining and interconnecting profiles 182, 184, 186 and 188 are configured in alternating fashion within the plasticized material layer associated with the mounting surface of the ECM, battery tray, etc. A pair of beams 187 and 189 establish perimeter defining locations between respective pairs 184/186 and 182/188 of the interconnecting profiles, the inner defined perimeter established by the profile further exhibiting a plurality of reconfigured inner seating/beam edges 190, 192, 194 and 196, these configured into the multi-dimensional retaining feature between the profiles 182-188, with selected edges 190 and 194 exhibiting a smooth curved surface profile, and further alternating edges 192 and 196 an irregular or chamfered profile, these collectively engaging and biasing the bolt fastener stem.

Figure 11A:
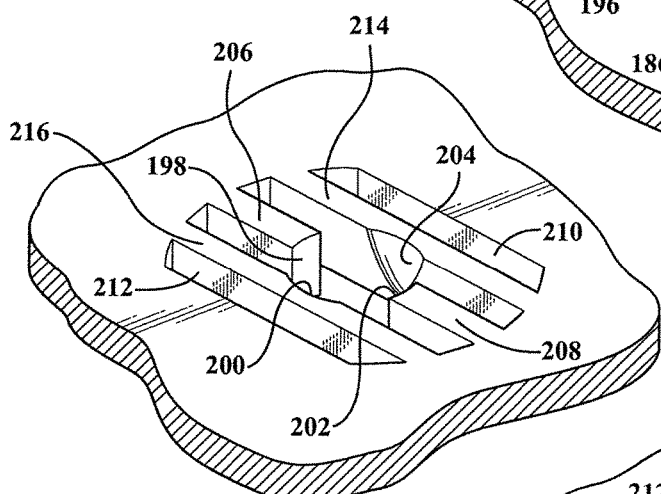
FIGS. 11A-11B are upper and lower perspectives of a mounting surface with multi-dimensional retaining feature according to a further variant and including a central chamfered circular aperture in combination with a plurality of overlapping, parallel extending and selectively intersecting slots which function to provide material deforming and non-shearing retention of pre-inserted bolt fasteners.
Figure 11B:
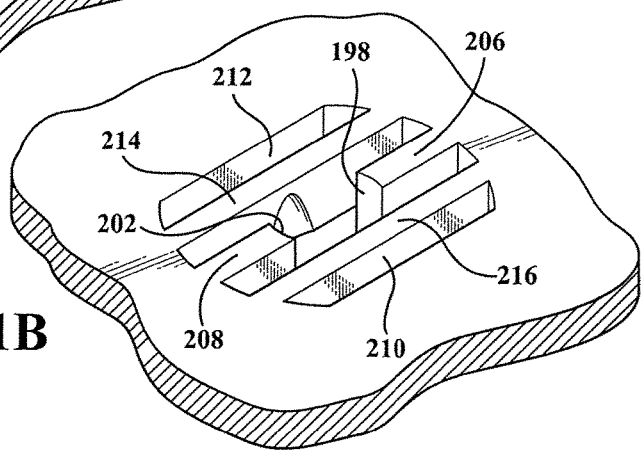

FIGS. 11A-11B are upper and lower perspectives of a mounting surface with multi-dimensional retaining feature according to a further variant and including a central chamfered circular aperture defined by spatially arrayed and encircling profile surfaces 198, 200, 202 and 204. A first pair of inwardly extending beams 206 and 208 establish the profile surfaces 198 and 202, with additional and outer extending slots 210 and 212 arranged in spatial fashion outward the beams 206 and 208 in order to create additional continuous extending beams 214 and 216 and in order to provide the aperture defining feature with a necessary degree of flexural give during bolt insertion. As previously described, then in-molded configuration of the retaining feature with deflection accommodating locations functions to provide material deforming and minimal shearing of material associated with the boundaries of the retention feature resulting from pre-insertion of bolt fasteners (not shown in this view).

Figure 12A:
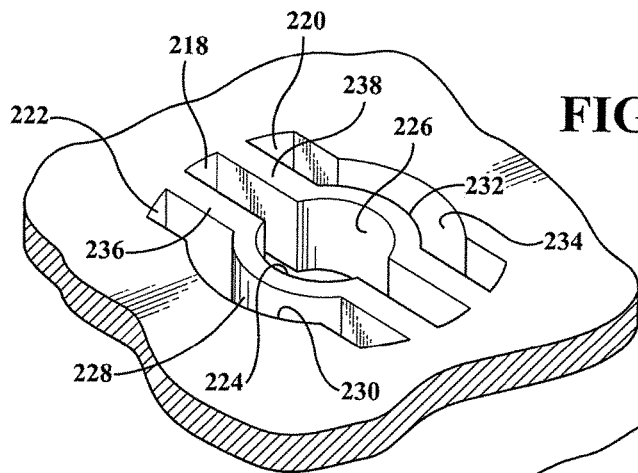
FIGS. 12A-12B illustrate upper and lower perspectives of a mounting surface similar to FIGS. 11A-11B in which the overlapping slots exhibiting arcuate intermediate contours which further define a circular central inserting location associated with the bolt fastener.
Figure 12B:
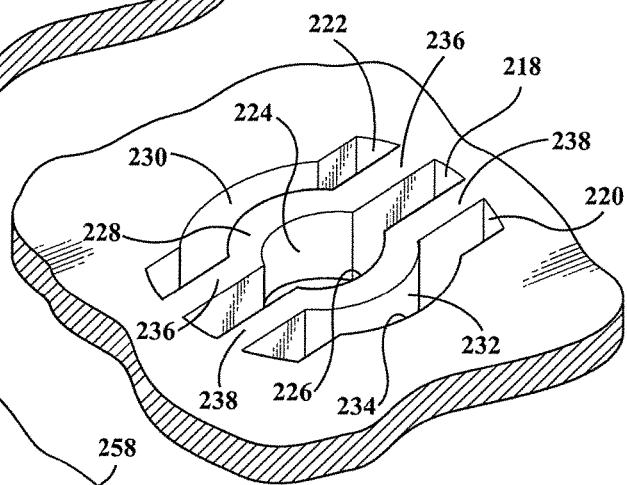

FIGS. 12A-12B illustrate upper and lower perspectives of a mounting surface similar to FIGS. 11A-11B, and in which a reduced plurality of slots 218, 220 and 222 each include arcuate intermediate contours, the middle slot 218 overlapping with an circular interior aperture profile, see additional surfaces 224 and 226, these collectively defining a circular central inserting location associated with the bolt fastener. The outer pair of slots 220 and 222 may each further include pairs of both arcuate (at 228/230 & 232/234) and straight opposing surfaces, again such that the configuration allows for both location of the inserting bolt stem and subsequent outward bowing or deflection of the pair of internal beams (further at 236 and 238) which are created by the inner 218 and outer 220/222 slots, this again being accomplished in both a minimal material shearing and subsequent fastener retaining fashion prior to shipping of the tray or other component with mounting surface and prior to end installation.

Figure 13A:
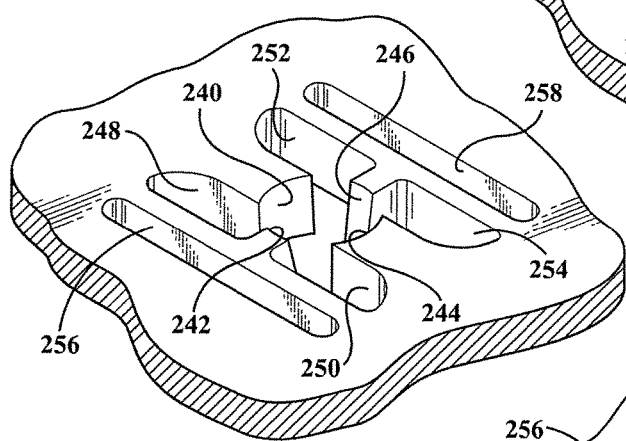
FIGS. 13A-13B illustrate upper and lower perspectives of a mounting surface with multi-dimensional retaining feature according to a further variant and including a central chamfered circular aperture in combination with an inner (substantially "H" shaped) communicating profile and a further pair of outer parallel extending slots which function to provide material deforming and non-shearing retention of pre-inserted bolt fasteners.
Figure 13B:
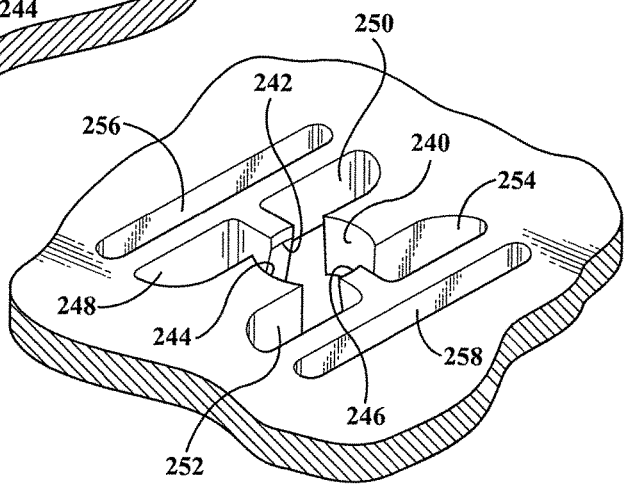

Proceeding to FIGS. 13A-13B, illustrated are upper and lower perspectives of a mounting surface with multi-dimensional retaining feature according to a further variant and including a central chamfered circular aperture (see arcuate extending and separated aperture profile defining portions 240, 242, 244 and 246), this in combination with an inner (substantially "H" shaped) communicating profile with pairs of wing defining aperture profiles 248, 250, 252 and 254 which are interconnected and which establish the corresponding inner and end supporting beams associated with the profile defining portions 240-246. A further pair of outer parallel extending slots 256 and 258 are illustrated and, in combination with the flexural properties associated with the aperture defining pattern, function to provide material deforming and associated minimal shearing/retention of pre-inserted bolt fasteners. A set of experimentation values associated with each of insertion force (173.4 N), extraction force (222.3 N), extraction after 25 N side load applied force (220.1 N) and side load breaking point force (37.5 N) are referenced according to the depicted and non-limiting variant.

FIGS. 14A-14B illustrate upper and lower perspective views of a mounting surface with multi-dimensional retaining feature according to a modification of FIGS. 13A-13B and including a modified central chamfered circular aperture (see larger substantially circular wall edge with 260 with spaced apart minor arcuate inner edge 262 projecting from deflectable beam 263. In combination, a reduced portion of an inner communicating profile (one half the pseudo "H" profile of FIG. 13 with profiles 264, 266 and outer parallel extending and closed slot 268 defined in part by a rib 270 supporting the flexural/deflectable beam 263) is provided which functions to provide material deforming and non-shearing retention of pre-inserted bolt fasteners. A set of experimentation values associated with each of insertion (205.5 N), extraction (199.8 N), extraction after 25 N side load application (202.2 N) and side load breaking point (45 N) forces, all in Newtons, are referenced according to the depicted variant and which can be determined through use of a force gauge such as depicted in FIG. 2.

FIGS. 15A-15B illustrate upper and lower perspectives of a further variant of mounting surface with multi-dimensional retaining feature, the upper perspective of FIG. 15A being an intermediate variant of FIGS. 4A and 5A including arcuate tapered inner wall edges 272, 274 and 276 alternating with radial shortened slots 278, 280 and 282. The lower perspective of FIG. 15B further shows an inner perimeter defined by arcuate tapered and segmented underside surfaces 284, 286 and 288 associated with the central retaining aperture, in combination with an outwardly concentric located and inwardly facing circumferential end wall 290 establishing a reduced thickness for the material defining feature and for providing material flexural deformation during bolt installation, again without shearing/loss of material or holding properties.

As further shown in FIG. 15B, the radial slots 278, 280 and 282 separate the underside tapered wall edge surfaces 272, 274 and 276, with recess cavities associated with the underside of the material retaining profiles depicted between the inner tapered engaging surfaces and the outer annular wall 290, this again in order to assist the retaining feature in providing the necessary degree of bend or deflection upon fastener insertion. Experimentation data includes a set of values associated with each of average insertion force (102.7 N), average extraction force (251.2 N), average extraction force (276.9 N) after side load A, average extraction force (224.1 N) after side load B, and side load breaking point (87 N) forces according to the depicted variant.

Figure 16A:
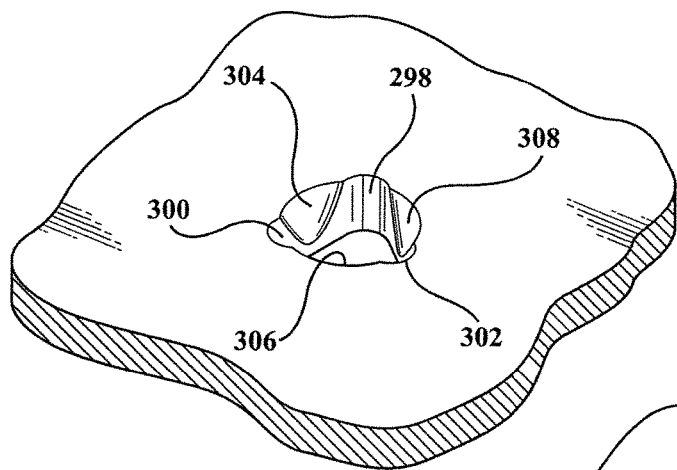
FIGS. 16A-16B illustrate a sub-variant of FIGS. 15A-15B having a modified triangular shaped underside retention profile with a top side circular chamfer profile for providing material deformation during bolt insertion while minimizing shearing and associated plastic material loss.
Figure 16B:
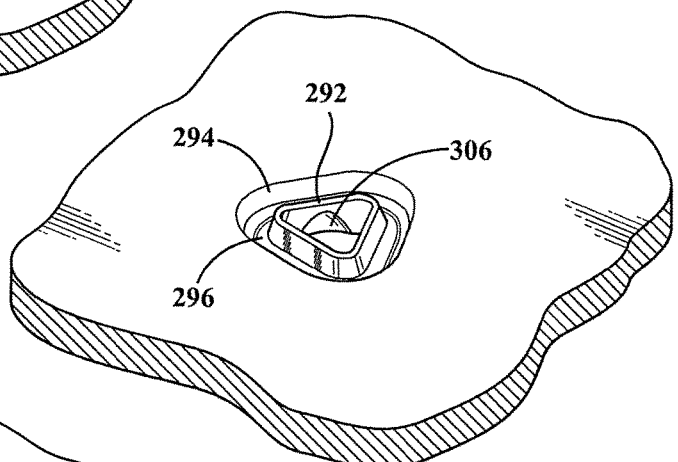

FIGS. 16A-16B illustrate a sub-variant of FIGS. 15A-15B and exhibits a modified triangular shaped underside retention profile (see in FIG. 16B underside view a three sided inner perimeter ledge 292 which defines the flexural component and outer spaced and inwardly facing underside support wall 294, the support wall 294 having a likewise rounded triangular profile and which is separated from the inner ledge 292 by a perimeter extending cavity with bottom perimeter surface 296). FIG. 16A additionally depicts a top side circular chamfer profile exhibited upon inner triangular defining surfaces of the inner underside perimeter ledge 292 and which are further depicted by arcuate and interconnected corners 298, 300 and 302, with alternating chamfer locations 304, 306 and 308, this again providing material deformation during bolt insertion while also minimizing shearing or loss of the plastic edge boundaries associated with the retention feature profile.

Figure 17A:
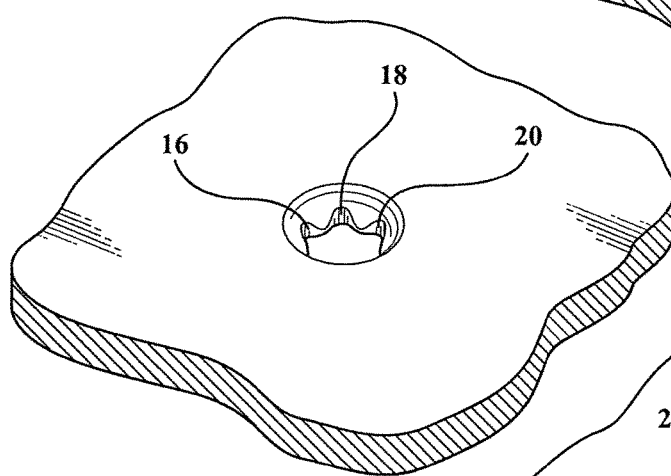
FIGS. 17A-17B are upper and lower perspectives of a material retaining feature similar to as previously depicted in FIGS. 1A-1B and better illustrating the irregular/arcuate and perimeter interconnecting inner material deformable profile in communication with an outer spaced and inwardly facing end wall.
Figure 17B:
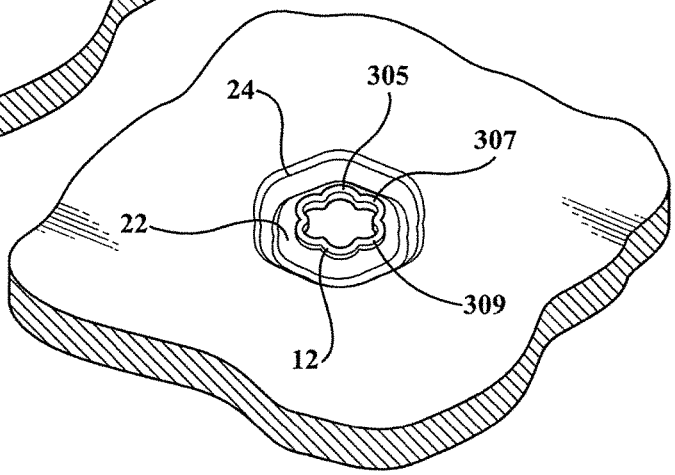
Figure 19A:
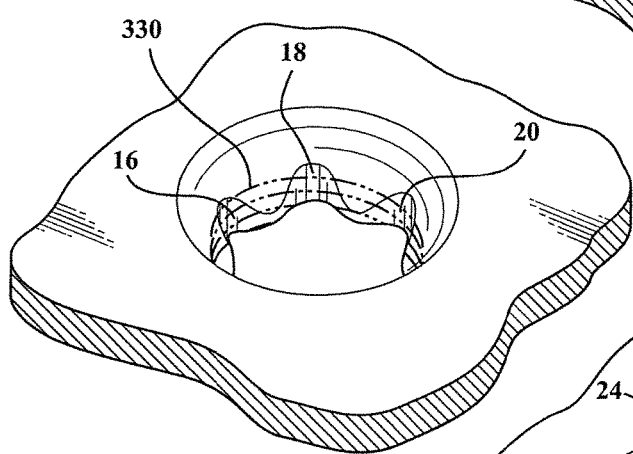
FIGS. 19A-19B are upper and lower perspectives of the material retaining feature as substantially depicted in FIGS. 17A-17B, with a lesser thickness.
Figure 19B:
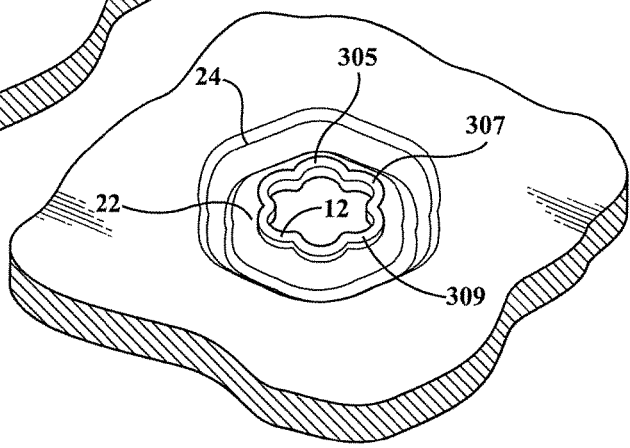

The profile of FIGS. 17A-17B largely replicates that previously depicted in FIGS. 1A-1B integrated into a different platform surface. The underside rotated perspective of FIG. 17B again depicts a modified hex pattern integrating six arcuate surfaces (at 305, 307, 309 et seq.) interconnected in an inner aperture defining profile for flexural contacting and gripping of the bolt shaft 14 (again FIG. 1B) in the manner previously described. An enlargement of this profile is further depicted in FIGS. 19A-19B.

Figure 18A:
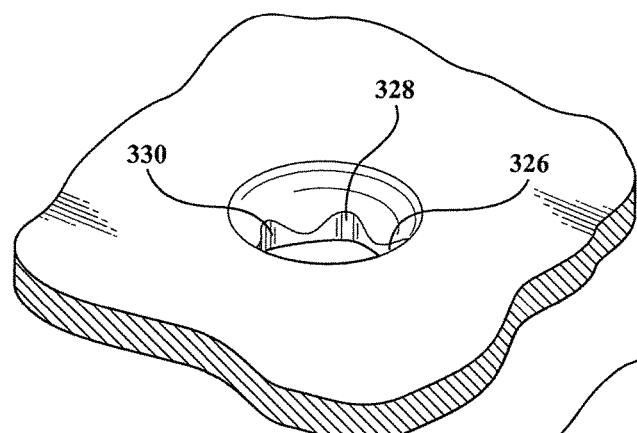
FIGS. 18A-18B are upper and lower perspectives of a variant of material retaining feature similar to FIGS. 17A-17B and illustrating a hexagonal underside profile.
Figure 18B:
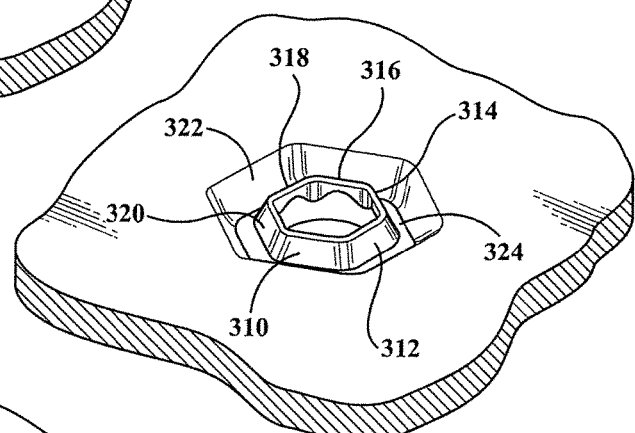

FIGS. 18A-18B are upper and lower perspectives of a variant of material retaining feature similar to FIGS. 1A-1B and illustrating a hexagonal underside profile (FIG. 18B) with inner angled sides 310, 312, 314, 316, 318 and 320, and outwardly spaced an inwardly facing underside outer wall 322 exhibiting a generally smoothed six sided or other polygonal profile and which is separated from the inner angled sides by a like perimeter concave channel or cavity 324. The upper side view of FIG. 18A also depicts the inside facing open edge established by the hex extending inner lip resulting from the inner angled sides 310-320 and which further exhibits chamfer or tapered inner locations (some of which are shown at 326, 328, 330, et seq.), again in order to provide the desired degree of flex or bend to the retaining feature in response to insertion of such as the threaded bolt stem.

Finally, FIG. 20 represents in tabular form a collection of experimental forces associated with several of the preceding variants, FIGS. 12B, 13, 14, 15, 17 and 19. It is further understood that the force values listed are non-limiting (owing to the variations in material construction (including without limitation such as a 30% glass filled polypropylene or other material construction, material thickness, etc.) and are provided primarily to reference the force properties associated with the fastener engaging profiles described and depicted herein.

The illustrated variants described are intended to represent only a few of an unlimited number of configurations and profiles which can manipulate or reconfigure the base layer material (such as including but not limited to a plastic or composite material exhibiting some degree of flex or bend in response to bolt fastener insertion) in a manner so as to achieve desired ranges of insertion, extraction and resistance to side loading forces. As previously indicated, this can include modifying (e.g. increasing) the fastener insertion forces to equal or, in certain instances, exceed the opposing extraction forces, such extraction forces usually being above a certain minimum threshold.

The test data referenced herein is further understood to be of supporting and explanatory value and which reinforces the understanding that profile reconfigurations are possible for engineering desired material holding properties to the base layer in a desired application. This can further include such test data factoring in side load forces applied from multiple directions and angles, as well as elevated temperatures resulting from more extreme environmental condition (e.g. readings at 90° C. reflecting operating within warm weather climates and/or heated engine compartments within which a battery tray, ECM module or the like can be located). To a lesser degree, extreme cold weather conditions may also affect the properties of the materials utilized.

Other variants further contemplate utilizing any process, system, kit or assembly for creating a desired material retaining profile configuration, such again not limited to any type of in-molding or other process for quickly and inexpensively producing a tray, ECM module or the like, again without the requirement of a backing nut or washer applied to such as the reverse face of the material, and in order to hold the pre-installed bolt in place prior to final assembly of the component (such as again to a vehicle). Consistent with the above, the present invention also contemplates the provision of a kit including the plastic article with mounting profile along with the inserted bolt fasteners, the mounting profile again capable of being integrated either directly into the material mounting layer of the battery tray, ECM, etc., or alternatively incorporated into each of a plurality of washer like attachments (such as aligning against the rear face of the mounting layer and overlapping standard mounting apertures in order to receive the threaded bolt).

Yet additional variants contemplate optionally providing a final installation nut for attachment to the pre-assembly of material mounting layer (with configured flexural and aperture defining profile) and attached bolt. Other variants contemplate the aperture defining profiles exhibiting inner threads (see as shown in phantom at 330 in the enlarged example of FIG. 19A which closely replicates FIGS. 1A and 1B), the threads 330 capable of being subsequently formed or pattern molded into the flexural engineered aperture profiles for the purpose of receiving, gripping and maintain the exterior threads of the attachable bolt stem 14 (see again FIG. 1B) without separate requirement of a nut or other fastener. Additional variants can include reconfiguring the fastener as a self-tapping screw which forms the desired threads within the material configured and aperture defining profile.

Having described my invention, other and additional preferred embodiments will become apparent to those skilled in the art to which it pertains, and without deviating from the scope of the appended claims.

I claim:

1. A retaining feature integrated into a mounting layer of a plasticized article, the article having a length, width and thickness with an upper surface and a lower surface, the retaining feature is adapted to receive and retain an exteriorly threaded fastener prior to a final assembly of the plasticized article, said retaining feature comprising:

the plasticized article having an inner perimeter defining an aperture within the mounting layer;

a series of interconnecting surfaces integrated into said inner perimeter visible from the upper surface, and including outwardly recessed undulating portions alternating with inwardly projecting portions, said inwardly projecting portions each having a tapering thickness in at least one of radial and axial directions as well as tapered inwardly from the upper surface, each projecting portion flexing upon through engagement of the fastener;

the lower surface of said mounting layer defining a perimeter depression which is concave in cross section and extending outwardly from said inner perimeter, said inner perimeter visible from the lower surface including a plurality of arcuate interconnecting surfaces which, upon installation of the fastener, flexes outwardly; and the fastener establishing a first insertion force and a second resistance to extraction force.

2. The retaining feature as described in claim 1, said insertion force being any of lesser, equal to or greater than said extraction force, in combination with respectable side load breaking/shearing strength of the bolt from the material defined retaining feature.

3. The retaining feature as described in claim 1, further comprising said extraction force being set at a threshold minimum.

4. The retaining feature as described in claim 1, the plasticized article having a specified shape and size not limited to a battery tray or electronic control module.

5. An assembly for mounting a first plasticized article to a second article, the first article having a length, width and thickness with an upper surface and a lower surface, the assembly comprising:

the first article having a mounting layer integrating a retaining feature;

a fastener pre-inserted through an aperture defined by an inner perimeter of said retaining feature and prior to final assembly;

said retaining feature further including a series of interconnecting and closed profile surfaces defining said aperture and, as visible from the upper surface, including outwardly recessed undulating portions alternating with inwardly projecting portions, said inwardly projecting portions each having a tapering thickness in at least one of radial and axial directions as well as tapered inwardly from the upper surface, each projecting portion flexing upon contact with an inserting stem portion of said fastener;

the lower surface of said mounting layer defining a perimeter depression which is concave in cross section and extending outwardly from said inner perimeter, said inner perimeter visible from the lower surface including a plurality of arcuate interconnecting surfaces which, upon installation of the fastener, flexes outwardly; and a further engagement aperture formed in the further article, the fastener being engaged through the aligning apertures and deflecting outwardly the tapered portions establishing a first insertion force and a second resistance to extraction force.

6. The assembly as described in claim 5, further comprising said plasticized article having a specified shape and size and not limited to a battery tray or electronic control module.

7. A retaining feature integrated into a mounting layer of a plasticized article, the article having a length, width and thickness with an upper surface and a lower surface, the retaining feature is adapted to receive and retain an exteriorly threaded fastener prior to a final assembly of the plasticized article, said retaining feature comprising:

the plasticized article having an inner perimeter defining an aperture within the mounting layer;

a series of interconnecting surfaces integrated into said inner perimeter, visible from the upper surface, and including outwardly recessed undulating portions alternating with inwardly projecting portions, said inwardly projecting portions each having a tapering thickness in each of radial and axial directions as well as tapered inwardly from the upper surface;

the lower surface of said mounting layer defining a perimeter depression which is concave in cross section and extending outwardly from said inner perimeter, said inner perimeter visible from the lower surface including a plurality of arcuate interconnecting surfaces which, upon installation of the fastener, flexes outwardly; and the fastener, establishing a first insertion force and a second resistance to extraction force.

\* \* \* \* \*